Jan. 15, 1957 V. VON KROGH SUNDT 2,777,190
RAM-TYPE TURRET LATHE HAVING POWER INDEX
Filed Dec. 20, 1951 4 Sheets-Sheet 1
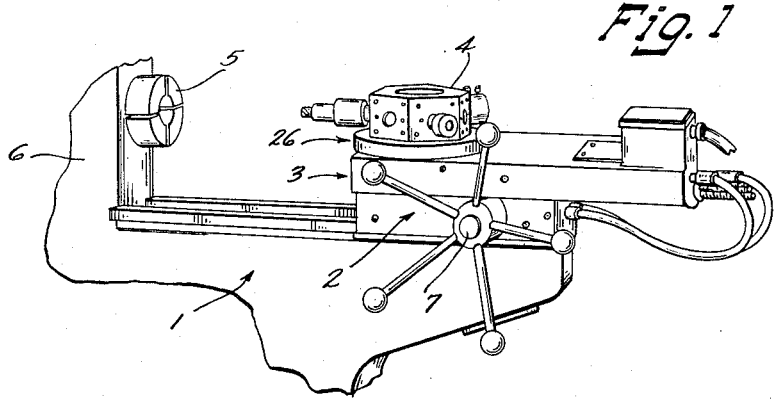
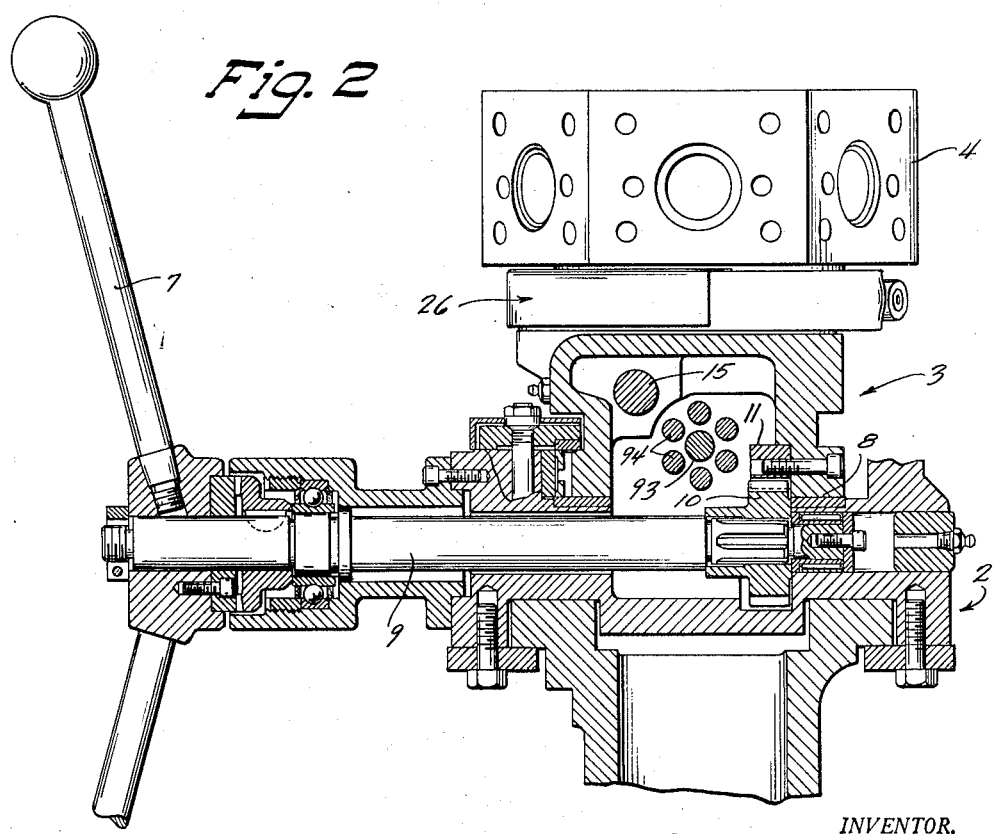
INVENTOR.
Vigo Von Krogh Sundt
BY Andrus & Scales
Attorneys Jan. 15, 1957

V. VON KROGH SUNDT 2,777,190

RAM-TYPE TURRET LATHE HAVING POWER INDEX

Filed Dec. 20, 1951

INVENTOR.
Vigo Von Krogh Sundt
BY Andrus & Scales

Attorneys

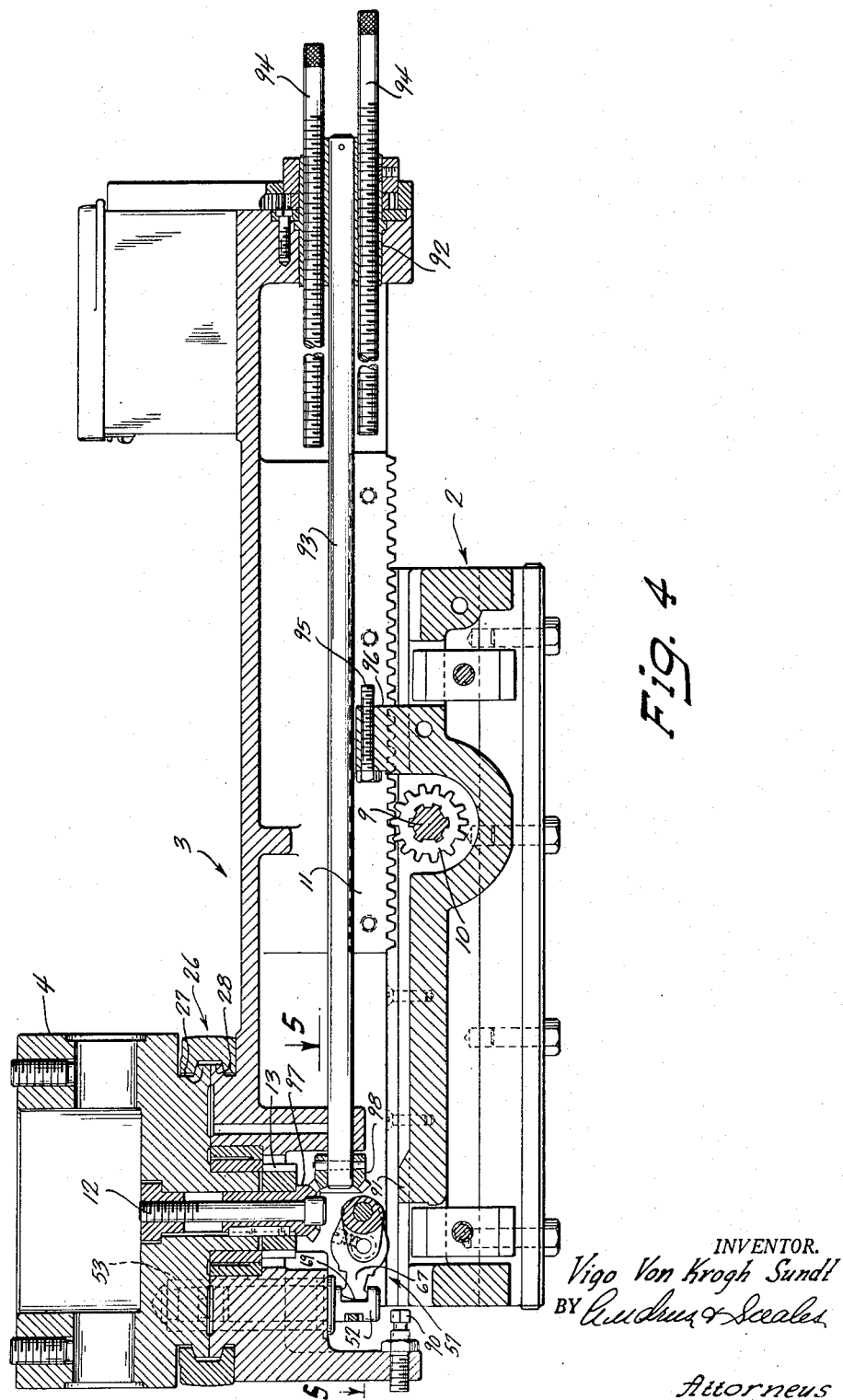

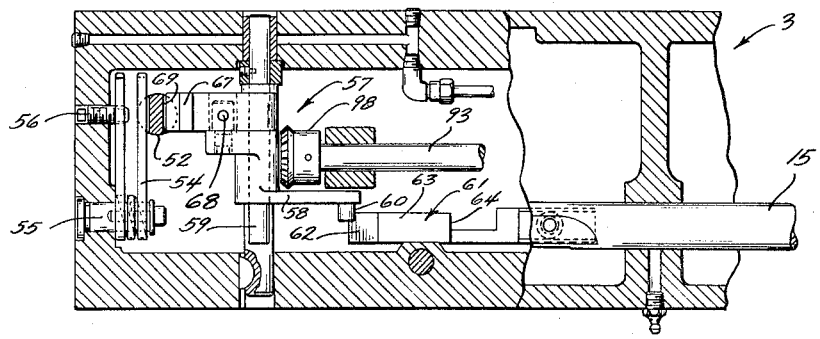
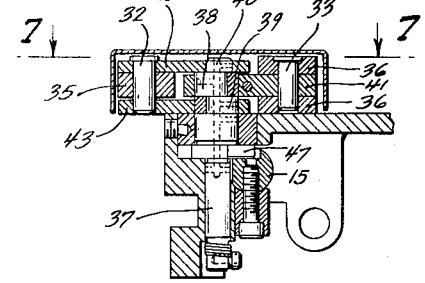
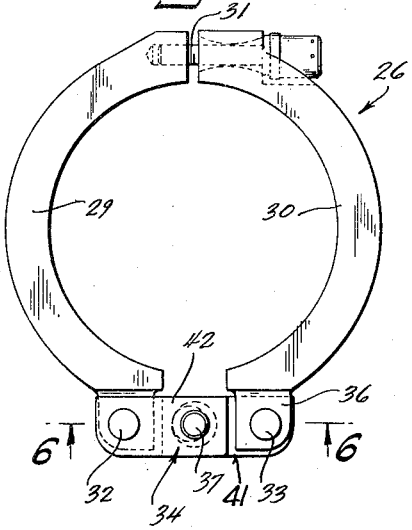
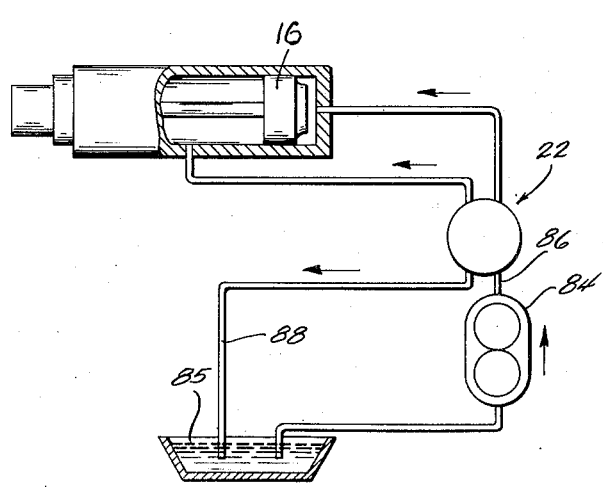

United States Patent Office 2,777,190
Patented Jan. 15, 1957

2,777,190

RAM-TYPE TURRET LATHE HAVING POWER INDEX

Vigo Von Krogh Sundt, Madison, Wis., assignor to Gisholt Machine Company, Madison, Wis., a corporation of Wisconsin Application December 20, 1951, Serial No. 262,593

3 Claims. (Cl. 29—46)

This invention relates to ram-type turret lathes employing either manual or automatic ram movement and having power indexing for the turret.

A principal object of the invention is to reduce the length of ram movement necessary to withdraw a turret supported tool from a workpiece and effect indexing of the turret. In the present invention, indexing turret rotation is effected by mechanism moving internally of the ram rather than by movement of the ram itself.

A further object of the invention is to reduce the extent of withdrawal of the turret ram toward its supporting saddle to reduce the access of chips and other foreign matter to the saddle.

A further object is to index the turret by control movements separate from movements of the ram, whereby a greater proportion of ram travel is devoted to useful working stroke.

Another object is to reduce operator fatigue where ram movement is manual by reducing the amount of ram travel necessary to perform a given work stroke.

A further object of the invention is to increase ram rigidity by reducing the amount of necessary extension of the ram from the saddle for a given work stroke, whereby the saddle affords better support for the ram.

A further object is to increase the safe operating speed of a turret ram by indexing the turret independent of ram movement thereby eliminating the substantial effect of ram momentum which would require slow ram movement during the indexing operation.

A further object of the invention is to eliminate an element of human error in manually operated turret rams by causing speed of indexing action to be unaffected by speed of ram movement.

A further object is to permit double indexing of two turret stations for one cycle of a manually actuated turret supporting ram.

Another object is to provide a hydraulic power actuated turret index contained within the ram.

In the present invention, a ram supported turret is indexed by a control piston moving internally of the ram when the ram has reached or is near the fully retracted point in its stroke. Turret clamping and locking operations, as well as indexing, are effected by movement of the control piston. An increased stroke for the ram to perform such functions is thereby eliminated.

The described lathe elements are adapted to be controlled in correlation with lathe headstock mechanism by control mechanism described in an application by Lorenz Leifer entitled Automatic Ram-Type Turret Lathe, Serial No. 262,617 filed on even date herewith and assigned to the assignee of the present invention.

Other objects and advantages of the invention will appear hereinafter in connection with the description of an embodiment of the invention illustrated in the accompanying drawings.

In the drawings:

Figure 1 is a front perspective view of a turret ram and saddle shown supported on a portion of the bed of a turret lathe;

Fig. 2 is a transverse sectional view of the ram taken axially of the pilot wheel drive shaft;

Fig. 4 is a vertical sectional view taken lengthwise of the ram on line 4—4 of Fig. 2;

Fig. 5 is a detail sectional view taken on line 5—5 of Fig. 4 and showing the lock pin actuating mechanism viewed from above;

Fig. 6 is a detail sectional view of the clamp ring actuating mechanism;

Fig. 7 is a detail schematic plan view of the clamp ring; and,

Fig. 8 is a schematic view of the hydraulic system for driving the indexing mechanism.

Figure 3:
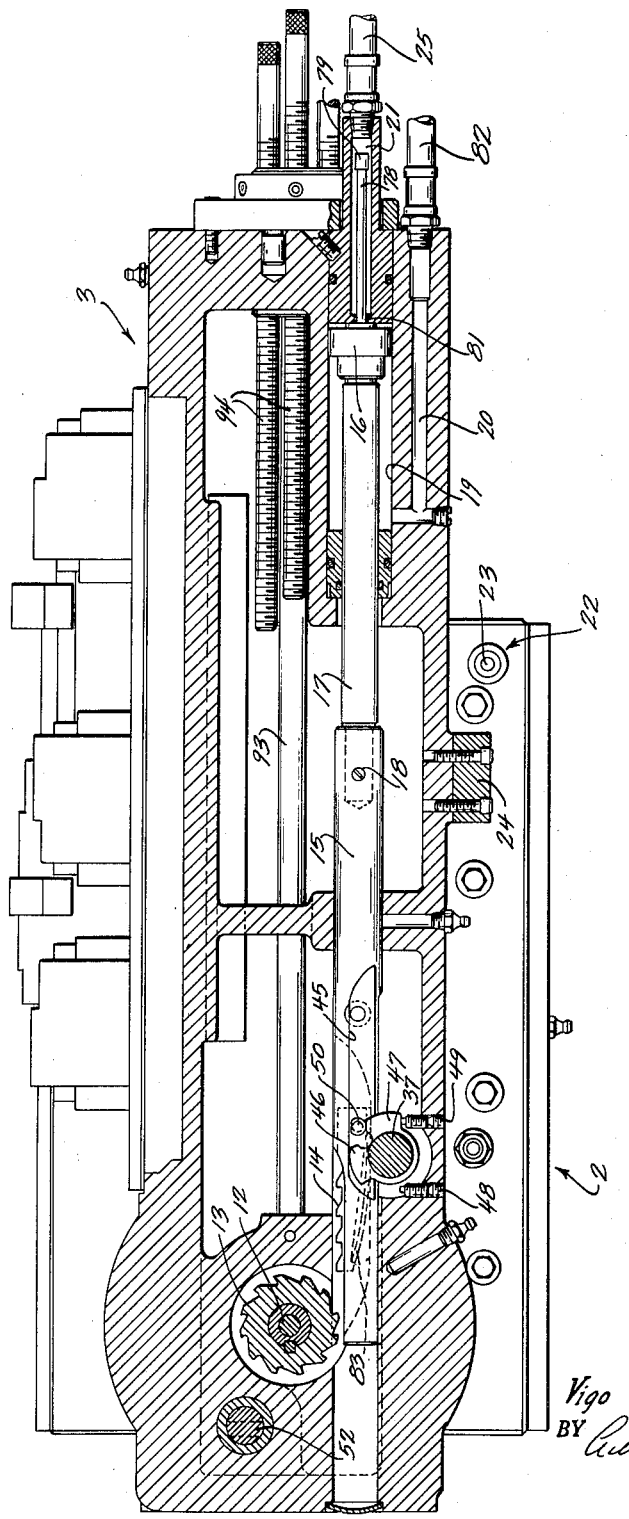
Fig. 3 is a horizontal sectional view taken lengthwise of the turret supporting ram on line 3—3 of Fig. 2.

The turret lathe illustrated in the drawings comprises a bed 1 supporting a saddle 2 upon which a turret ram 3 is reciprocally mounted. A hexagonally-shaped turret 4, carried by ram 3, is extended to and retracted from a workpiece carried by a chuck 5 on lathe headstock 6. The described ram 3 is manually reciprocated by rotation of a pilot wheel 7, but the ram may be automatically driven while operating in accordance with the invention.

As best shown in Fig. 2, the ram 3 is supported for movement by ways 8 carried by the stationary saddle 2. A drive shaft 9 extends laterally to within the saddle 2 from pilot wheel 7 inwardly terminating in a drive pinion 10. Pinion 10 reciprocally drives ram 3 on ways 8 by rotational engagement with a downwardly facing rack 11 carried by the wall of the ram opposite pilot wheel 7. Rack 11 extends longitudinally of ram 3 a distance to provide the desired range of ram stroke.

As ram 3 reciprocates relative to chuck 5 on headstock 6 by manual rotation of wheel 7 and drive pinion 10, tools (not shown) carried on the six faces of turret 4 are selectively presented to a workpiece by rotational indexing of the turret.

For this purpose, turret 4 is mounted for rotation on a vertically disposed spindle 12 extending downwardly from the turret to within turret ram 3, as shown in Fig. 4. Near its bottom end, the spindle 12 carries a ratchet gear 13 keyed to rotate therewith. Rotation of ratchet 13 effects rotation of spindle 12 and indexing rotation of turret 4. The illustrated ratchet 13 carries twelve teeth, whereby a new tool face of hexagonal turret 4 is presented each time the ratchet has arcuate movement equivalent to two of its twelve teeth.

The ratchet 13 for indexing turret 4 is actuated by a pawl 14 carried at the forward end of an indexing control rod 15, as best shown in Fig. 3. Control rod 15 reciprocates independently of the movement of turret supporting ram 3 in response to movement of a piston 16 carried by a piston rod 17 rearwardly of and axially aligned with control rod 15. Piston rod 17 and control rod 15 are joined together in endwise relationship by a set screw 18 laterally projecting through the rod 15 and entering a portion of piston rod 17 carried internally of the rod 15.

Piston 16 for reciprocating indexing control rod 15 is disposed within a cylinder 19 formed in the body of ram 3. Fluid is alternately admitted to the cylinder 19 at opopsite sides of the piston through passages 20 and 21 formed in the ram body.

Admission of power fluid to cylinder 19 is controlled by movement of the ram 3 on saddle 2. For this purpose, a valve assembly 22 is carried by the saddle 2 and has a valve plunger 23 extending outwardly from the saddle adjacent the front side of ram 3. The ram 3 carries a trip block 24 on its front wall substantially centrally thereof. The valve plunger 23 extends outwardly into the path of trip block 24 and is depressed thereby when the ram 3 has reached the rearward end of its stroke.

Depression of valve plunger 23 by trip block 24 causes valve assembly 22 to admit fluid to the rear side of piston 16 through a fluid hose or conduit 25 connecting the valve assembly with passage 21 in the body of saddle 2. The piston 16, piston rod 17, and indexing control rod 15 are thus moved inwardly through ram 3 toward turret 4. The fluid system for controlling piston 16 is schematically shown in Fig. 8.

Forward movement of indexing control rod 15 eventually results in engagement between pawl 14, carried by the rod, and ratchet 13, carried by the turret spindle 12, whereby the turret is indexed. But, prior to engagement between the pawl and ratchet, it is necessary to release clamping and locking mechanism provided to secure the turret 4 against rotation in each indexed position.

The turret 4 is clamped against rotation by a channel-shaped clamp ring 26 which encircles complementary annular flanges 27 and 28 respectively formed on a lower peripheral surface of the turret 4 and an upstanding frontal portion of ram 3. The flanges 27 and 28 are held against rotation in abutting relation by the clamp ring 26 during the working stroke of ram 3 and turret 4.

The clamp 26 is of the split ring type, comprising two half or semi-circular sections 29 and 30. Two of the meeting ends of sections 29 and 30 are joined by a pin 31 which permits a pivotal rocking action of section 30 about the pin, while the other ends are joined by link pins 32 and 33 and an eccentric connecting mechanism 34, as shown in Figs. 6 and 7. Link pin 32 extends through a reduced tongue 35 carried by the end of ring section 29. Link pin 33 extends through each of two vertically spaced lugs 36 carried by the end of ring section 30.

The link pins 32 and 33 are drawn together and separated with their associated clamp ring sections 29 and 30 to clamp and release turret 4 by the eccentric connecting mechanism 34. Mechanism 34 comprises a ring actuating spindle 37 having its lower end disposed in the body of ram 3 and with its upper portion extending upwardly from the body to between link pins 32 and 33.

The upper, enlarged portion of spindle 37 has three eccentric sections or cranks 38, 39, and 40, for causing relative movement between link pins 32 and 33 upon rotation of spindle 37 (see Fig. 6). Eccentric 38 is connected to link pin 33 by link 41 extending between lugs 36 on ring section 30. Eccentrics 39 and 40 are connected with link pin 32 by links 42 and 43 which straddle the tongue 35 on ring section 29. Rotation of spindle 37 in one direction causes the eccentrics to separate the link pins through the associated links 41, 42, and 43, while opposite rotation of spindle 37 draws the links and ring sections together to clamp turret 4.

Rotation of ring actuating spindle 37 and resulting tightening or release of clamp ring 26 is controlled by indexing control rod 15. Release of the clamp ring is effected prior to engagement between pawl 14 carried by the rod 15 and turret indexing ratchet 13. For this purpose, control rod 15 is formed with an elongated recess 45 opening outwardly from the rod, as shown in Fig. 3. Spindle 37 extends downwardly from clamp ring 26 to adjacent rod recess 45, and a pair of lugs or knob abutments 46 and 47 are carried by the lower end of spindle 37 circumferentially spaced approximately ninety degrees of one another. Two stop screws 48 and 49 extend from the forward wall of ram 3 to adjacent opposite sides of spindle 37 to limit rotational movement of the spindle in opposite directions by engaging lugs 46 and 47 respectively.

Clamp ring actuating spindle 37 is disposed adjacent the path of control rod 15 whereby one of the lugs 46 or 47 is disposed in the recess 45 whenever the other lug is engaging its respective stop screw 48 or 49.

Rotation of spindle 37 to release clamp ring 26 occurs when a cam pin 50 extending upwardly from arm recess 45 engages the lug 46 on spindle 37, the spindle then being positioned as shown in Fig. 3. Upon engagement between cam pin 50 and lug 46, the spindle 37 is rotated counter-clockwise as viewed in Fig. 3, with a resultant loosening of clamp sections 29 and 30 through the relocation of their respective link pins 32 and 33. Continued forward motion of control rod 15 causes lug 46 to engage its stop pin 48. Upon reverse travel of rod 15, the lug 47 is engaged by cam pin 50 to re-clamp ring 26, as will be described.

The turret 4 is further held against rotation in a given indexed position by a locking pin 52 disposed within the forward end of ram 3 and extending upwardly to within a selected socket 53 formed in the underside of turret 4 adjacent each turret station or face. The pin 52 is pointed at its upper end, and the mouths of sockets 53 are chamfered to facilitate entry of the pin to within the appropriate socket.

Pin 52 is withdrawn from a socket 53 prior to indexing of the turret 4. Retraction of pin 52 exists only for a period sufficient for rotational indexing of the turret, and the extension of the pin 52 into the socket associated with the turret face to be next worked terminates rotation of the turret in a given indexing cycle. Retraction of pin 52 is therefore but momentary.

As best shown in Fig. 5, the pin 52 is biased to extended or upward position by a hair-pin type spring 54 carried by a stud 55 extending from the forward wall of ram 3. The leg of spring 54 nearest the forward ram wall is held in a diagonally upward position by a screw 56 disposed adjacent stud 55. The other leg of the spring is carried by a slot in pin 52 and seeks to take an inclined position similar to its other leg, thereby urging locking pin 52 upwardly.

The pin 52 is withdrawn or retracted by the pivotal action of a crank assembly 57. Assembly 57 comprises a cam lever 58 rotatable about a horizontally disposed pivot shaft 59 keyed to opposite walls of the ram 3. Lever 58 carries a follower 60, which is actuated by a cam 61 forming part of control rod 15. The cam 61 is disposed on rod 15 centrally of clamp ring cam pin 50 and pawl 14.

Cam 61 has an inclined cam surface 62 extending upwardly in a rearward direction to a flat portion 63 which drops off suddenly at vertical surface 64 lying normal to rod 15.

Indexing control rod 15, having released clamp ring 26 through engagement between cam pin 50 and the lugs on clamp ring spindle 37, presents cam 61 to the follower 60 on locking pin lever 58 to ride the lever upwardly upon inclined cam surface 62, holds the lever in pivoted position while flat cam surface 63 supports the follower, and finally releases the lever when drop-off surface 64 is reached during forward movement of rod 15. While pivoted upon cam 61, cam lever 58 has retracted locking pin 52 by causing similar pivotal action of a pin lever 67 disposed adjacent lever 58 on pivot shaft 59. The two levers are fixed together for pivotal movement by a coupling pin 68 extending therebetween. Lever 67 has its outer end disposed in a slot 69 formed in locking pin 52, whereby pivoting of pin lever 67 with cam lever 58 retracts the pin 52.

As cam follower 60 rides upon surfaces 62 and 63 of the cam 61 carried by control rod 15, the pawl 14, carried forwardly by the rod, engages ratchet 13 on turret rotating spindle 12 to index the turret. Combined cam surfaces 62 and 63 are of sufficient length to permit all four teeth on pawl 14 to rotate ratchet 13 a distance equivalent to four of its teeth, thereby indexing turret 4 two faces or stations.

The coupling pin 68 joining pin lever 67 with cam lever 58 is loosely disposed between the same to permit a small amount of pivotal movement therebetween. The pin 68 is spring pressed to a downward position whereby the levers are normally held substantially in a common plane. However, after the cam follower 60 has ridden beyond the rear end of cam 61 and the cam begins its rearward travel, the cam lever 58 may slightly pivot downwardly relative to pin lever 67 to ride below cam 61. After clearing below the cam, lever 58 pivots upwardly to again lie substantially in the plane of lever 67.

The drop-off surface 64 of cam 61 is so disposed as to release cam lever 58 just as the fourth tooth on ratchet 13 is indexed. The locking pin 52 then extends into the socket 53 associated with the next turret station to be worked, and forward movement of control rod 15 is terminated, the ratchet 13 and pawl 14 being locked against further movement by the locking action of pin 52.

To insure location of a socket 53 by locking pin 52, a dwell in the movement of control rod 15 and turret 4 is effected as the socket to receive the pin registers therewith. The dwell is effected by temporarily throttling the admission of pressure fluid to the rear of piston 16 through passage 21. A tail rod 78 extends from the rear of piston 16 into passage 21 about which the pressure fluid normally flows. Tail rod 78 is formed with a concentric flange 79 which enlarges the rod at one point. A reduced portion 81 is formed in passage 21 to laterally align with flange 79 at a point in the travel of control arm 15 when the turret 4 has been indexed so as to present a socket 53 above locking pin 52. When flange 79 and reduced passage portion 81 align, supply of fluid through passage 21 is momentarily interrupted causing rod 15 to slow down in its forward movement with a reduction in rotary indexing speed. The locking pin 52 may then enter a socket 53 when the turret 4 is rotating at reduced speed.

The present invention contemplates use of but three of the six turret faces for a given cycle. However, the other three faces may carry tools, whereby the turret may be alternately used for two different jobs. The turret 4 may be manually rotated on ram 3 upon completion of one job, when locking pin 52 is in retracted position, as described above. Once the turret has been manually rotated one station, the three turret stations previously unused will be successively indexed automatically by control rod 15 for operation upon another type of workpiece, two stations being indexed for each cycle of the rod.

When pin 52 has been released to extended position, indexing having been completed, the lathe operator may properly manually drive ram 3 forwardly of saddle 2 by rotating pilot wheel 7. As soon as ram 3 begins forward movement, the trip block 24 carried by the ram moves from above valve plunger 23, releasing the same and terminating supply of fluid to the rear end of piston 16 through supply conduit 25. Released by block 24, the valve plunger 23 is biased to upward position, and valve assembly 22 admits fluid to the forward side of piston 16 through a conduit 82 and passage 20 causing the piston and control rod 15 to move rearwardly.

When rod 15 moves rearwardly, the ratchet 13 and pawl 14 part. To facilitate parting of the respective teeth on the ratchet and pawl, pawl 14 is pivotally carried by control rod 15 upon the pin 50, which serves to actuate clamp ring spindle 37. The pawl is urged to a position in lengthwise alignment with rod 15 by leaf spring 83, but may swing laterally from ratchet 13 in separating from the same.

As control rod 15 moves rearwardly, the cam pin 50 engages lug 47 on clamp ring spindle 37 reclamping ring 26 and turret 4 in the newly indexed position of the latter. Rod 15 returns to its rearward position to await rearward travel of ram 3 after completion of the work cycle, at which time valve assembly 22 is again actuated by trip block 24 on the ram to cause the rod 15 to begin a second indexing stroke.

Valve assembly 22, related to piston 16 in the schematically shown hydraulic system of Fig. 8, is of the type permitting the inlet passages 20 and 21 leading to opposite sides of piston 16 to serve as drain passages upon reversal of piston action. A pump 84 supplies fluid to valve assembly 22 from a sump 85 through fluid line 86. Fluid line 88 leading from assembly 22 to sump 85 serves as a drain.

Rearward movement of ram 3 on saddle 2 is limited by a stop screw 90 carried by a downwardly projecting portion of the ram at the front thereof. As shown in Fig. 4, stop 90 engages an upward abutment 91 on saddle 2 as the ram reaches the rear of its travel.

Ram 3 and stops 90 and 91 are disposed relative to saddle 2, whereby stop 90 terminates rearward movement of the ram before the forward end of the ram reaches the forward ends of ways 8 on saddle 2. The forward portions of ways 8 are, therefore, never exposed to ingress of chips and other foreign material, being continually in supporting engagement with the ram 3. The ram 3 may readily be disposed for travel whereby it never retracts beyond the forward end of ways 8, because no portion of ram travel is devoted to indexing power actuation, the power being independently applied by piston 16 for rod 15. Travel of ram 3 may be limited to that necessary for tool orientation.

Forward movement of ram 3 is selectively limited by a stop roll 92 supported on a stop shaft 93 which extends longitudinally of ram 3 substantially centrally thereof. The roll 92 is carried by the rear end of shaft 93 and in turn supports six stop screws 94 equally spaced circumferentially of the roll, one screw for each turret face. Upon forward movement of the ram 3, the stop roll 92, carried therewith, presents a screw 94 in alignment with a stationary screw 95 carried by a lug 96 upstanding from saddle 2. Engagement between screw 95 and a stop screw 94 limits forward ram travel, their relationship being best shown in Fig. 4.

Stop roll 92 is indexed by the rotation of turret 4 and its spindle 12. For this purpose, a gear 97 is carried with the spindle 12 at its lower end to rotate a gear 98 on the forward end of stop shaft 93 for roll 92. The stop roll is thus indexed to present a new stop screw 94 in correlation to presentation by turret 4 of a newly indexed face.

Only one point in the travel of ram 3 on saddle 2 is concerned with actuation and control of indexing operations, that being the point in travel where valve plunger 23 is depressed by trip block 24 to control admission of pressure fluid to the cylinder 19 for rod piston 16.

Normally, depression of valve plunger 23 occurs at the extreme rearward or retracted position of ram 3. Travel of ram 3 may, therefore, be limited to a useful working stroke for presenting and withdrawing a tool. The extent of necessary ram travel is thus reduced.

Ram rigidity is increased in that the ram need be extended but a short distance from saddle 2. Operator fatigue is lessened in that manual actuation of pilot wheel 7 is reduced, necessary ram travel having been reduced.

Speed of ram travel may be increased, and the operator need be less cautious in effecting such travel with the described lathe. Since power for indexing is provided independently of ram travel and normally occurs when the ram is stationary in fully retracted position, the momentum of the ram is not a factor in the application of indexing power, and the ram need not travel at a reduced speed during any portion of its travel to protect indexing mechanism.

The hydraulic power actuation of indexing mechanism effects smooth and positive action, as distinguished from lathes having indexing power more closely mechanically related to ram travel.

Various embodiments of the invention may be employed within the scope of the following claims.

I claim:

1. A power index for turret lathes and the like having a ram and a turret mounted thereon for indexing movement, comprising, means carried by said turret for effecting indexing movement thereof relative to said ram, clamping means to alternately clamp and release the turret in operating and indexing relation to the ram, a spindle carried by said ram and disposed to operate said clamping means, a control rod mounted for reciprocal movement within said ram, an abutment carried by said control rod, a pair of lugs carried by said spindle and angularly spaced about the spindle axis for alternate disposition in the path of said rod abutment upon rotation of the spindle, and a pair of stops disposed adjacent said spindle to limit rotation thereof in each direction of rotational movement by engagement with a corresponding lug when the lug is disposed without the path of said rod abutment to retain the other lug within said path, said rod being disposed to present the said rod abutment to engage one of said lugs in one direction of reciprocal rod movement and to engage the other lug in reverse rod movement to alternately effect clamping and releasing rotation of the spindle, and the final clamping position for said spindle being secured by confinement of the corresponding lug between said rod abutment and one of said stops.

2. In a turret lathe or the like having a ram and a turret mounted thereon for relative indexing movement, means carried by said turret for effecting indexing movement thereof relative to said ram, a locking pin carried by said ram and mounted for selective endwise extension and retraction, a plurality of sockets in the body of said turret each disposed to selectively receive said locking pin at an indexed position of said turret upon pin extension, a lever assembly connected with said pin and pivotally mounted within said ram body for retracting and extending said pin, a rod disposed for lengthwise movement within said ram body to operate said means to effect indexing movement of said turret, cam means carried by said rod to operate said lever assembly to retract the locking pin upon movement of said rod and to release the lever upon further rod movement to return the pin to extended position after indexing has occurred, a piston connected to drive said rod, an inlet passage for pressure fluid disposed rearwardly of said piston and aligned therewith and being formed with a restricted portion, a tail rod carried by said piston and extending to within said passage, and means carried by and enlarging a portion of said tail rod, said tail rod enlarging means being disposed to register with the restricted portion of said passage to temporarily throttle fluid admission just prior to registry of said pin with a recess, whereby pin extension occurs while the turret is moving at reduced speed.

3. In a ram-type turret lathe including a saddle reciprocable on the bed of the lathe and a ram reciprocable on said saddle in the same directions as that of the saddle and having a tool turret selectively rotatable to several indexed positions, said ram and turret having a mechanism including power means effecting turret rotation to said several positions and securement of the turret with respect to the ram in each of said several positions, said ram having a rotatable member carrying a series of adjustable abutment means and rotatably connected with said turret to present one of said abutment means for engagement with the saddle for each of said several positions of the turret so that the maximum movement of the ram relative to the saddle and in the forward feed direction of the several tools to be carried by the turret is selectively adjustable and automatically effected, and control means and an actuating member therefor carried by said ram and saddle, said control means being connected to said power means and said actuating member being engageable with said control means at the limit of retraction of the ram relative to the saddle to effect the operation of said power means and the selective positioning of said abutment means, the adjustment of said abutment means and positioning of said saddle allowing provision for the indexing of the turret just after a given tool has cleared the work whereby unnecessary ram travel may be eliminated.

References Cited in the file of this patent

UNITED STATES PATENTS

| | | |
|---|---|---|
| 401,795 | Schumacher et al. | Apr. 23, 1889 |
| 457,967 | Hartness | Aug. 18, 1891 |
| 497,851 | Worsley | May 23, 1893 |
| 921,983 | Hanson | May 18, 1909 |
| 1,745,460 | Sudhoff | Feb. 4, 1930 |
| 1,813,484 | Class | July 7, 1931 |
| 2,054,018 | Gilchrist | Sept. 8, 1936 |
| 2,154,514 | Lange | Apr. 18, 1939 |
| 2,289,957 | Godfriaux | July 14, 1942 |
| 2,417,366 | Kylin et al. | Mar. 11, 1947 |
| 2,453,120 | Curtis | Nov. 9, 1948 |
| 2,549,746 | Kylin et al. | Apr. 17, 1951 |